Figure 1:
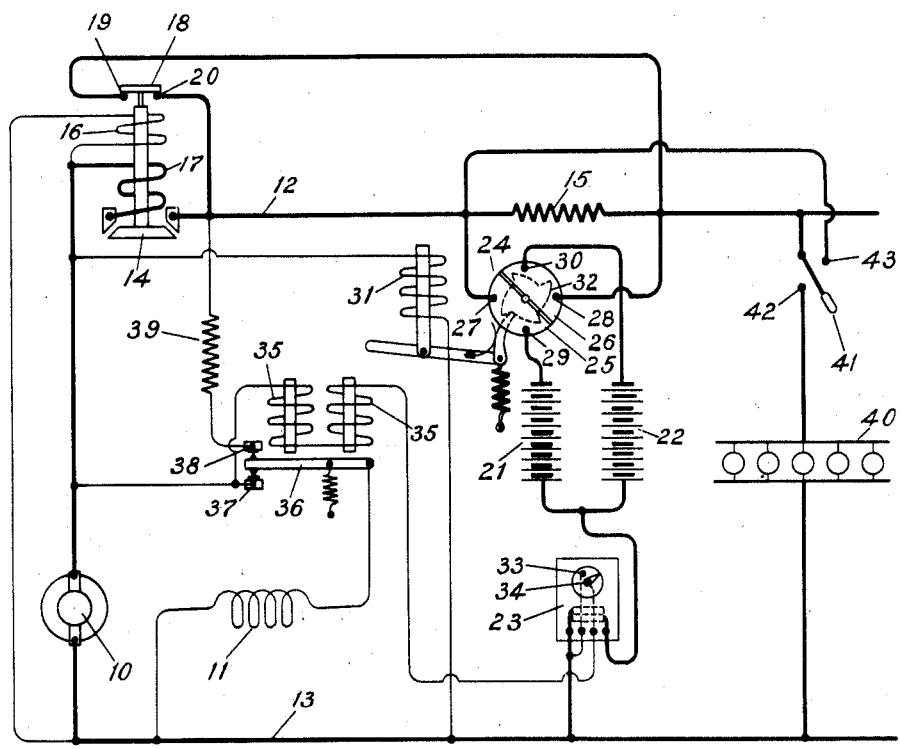

Oct. 16, 1923.

W. L. BLISS 1,471,093

SYSTEM OF ELECTRICAL DISTRIBUTION

Filed June 3, 1916   2 Sheets-Sheet 1

Witnesses
David H. Tinkler
Ralph Munden

Inventor
William L. Bliss

By Raymond H. Van Kest.

Attorney

Oct. 16, 1923. 1,471,093
W. L. BLISS
SYSTEM OF ELECTRICAL DISTRIBUTION
Filed June 3, 1916 2 Sheets-Sheet 2

Witnesses
David H Tinkler
Ralph Munden

Inventor
William L. Bliss
By Raymund H. Van Vliet
Attorney

Patented Oct. 16, 1923.

1,471,093

UNITED STATES PATENT OFFICE.

WILLIAM L. BLISS, OF NIAGARA FALLS, NEW YORK, ASSIGNOR TO U. S. LIGHT & HEAT CORPORATION, OF NIAGARA FALLS, NEW YORK, A CORPORATION OF NEW YORK.

SYSTEM OF ELECTRICAL DISTRIBUTION.

Application filed June 3, 1916. Serial No. 101,544.

*To all whom it may concern:*

Be it known that I, WILLIAM L. BLISS, a citizen of the United States, residing at Niagara Falls, in the county of Niagara and State of New York, have invented new and useful Improvements in Systems of Electrical Distribution, of which the following is a specification.

The present invention relates to systems of electrical distribution.

More particularly the invention relates to systems of electrical distribution applicable to lighting of railway cars in which two storage batteries are used. Under certain conditions, when the car is in motion, the generator, which is belted to the car axle, will charge one of the storage batteries while the other will act to regulate the voltage on the translation circuit. When the train is stopped, said batteries will be connected in parallel to supply the lamp circuit.

An object of the present invention is to provide a system employing two storage batteries as stated, in which system the storage batteries will be protected against overcharge.

A further object is to provide a system of the kind referred to in which the action of the charging generator will be controlled according to the net state of charge of the storage batteries.

A further object of the invention is to provide a novel means of controlling the operative period of a shunt field generator in a car-lighting system whereby the battery charging period may be limited.

Further objects will be apparent as the description proceeds.

In the drawings:—

Figure 1 discloses a system particularly adaptable to the well known Stone system of car-lighting.

Figure 2:
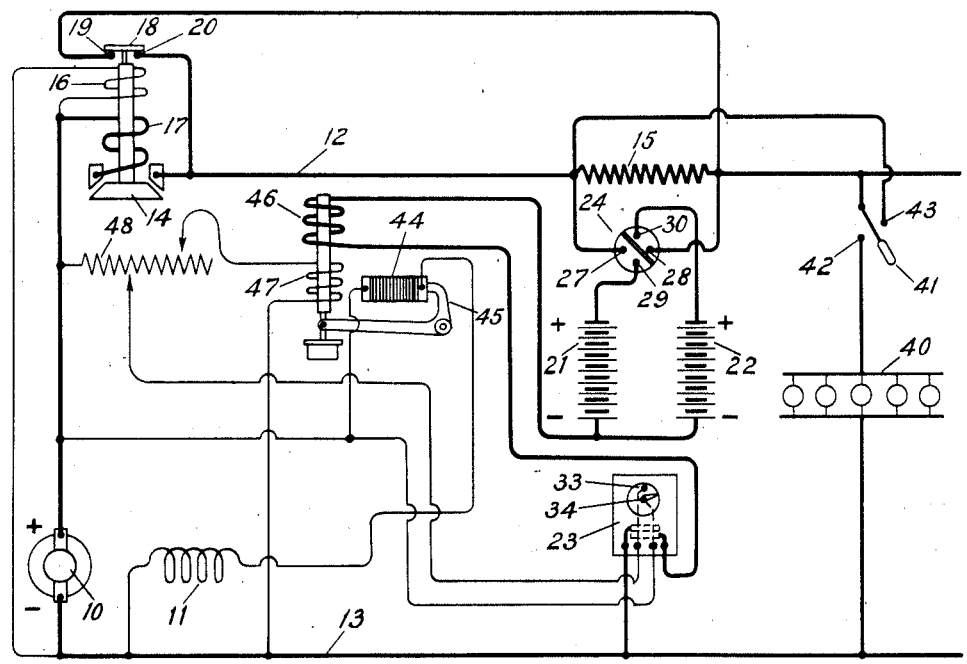

Figure 2 shows a modified system.

Reference may now be made to Figure 1 which discloses a system particularly adaptable to the well known Stone system of car-lighting. That system employs a generator belted to the car axle, two storage batteries, a translation circuit supplied by the generator when the same is operative and supplied by the batteries when the generator is inoperative. One of the batteries is in a position to be charged when the generator is operative and the other battery acts to regulate the voltage on the translation circuit. Mechanical switches are provided to reverse the positions of the batteries at intervals. The salient feature of the Stone system is that the generator is regulated to produce a constant current or wattage by means of a belt slipping arrangement. In Figure 1, the numeral 10 indicates the generator, which may be belted to the car axle. Said generator is provided with a shunt field winding 11 adapted to be connected across its terminals. Said generator supplies mains 12 and 13. The main 12 is provided with an automatic switch 14 and a resistance 15, the function of which will be presently described. The automatic switch 14 is provided with the usual lifting coil 16 and the usual holding coil 17. The automatic switch is also provided with an auxiliary contact 18 which, when the automatic switch is open, is adapted to close a circuit between contacts 19 and 20 to close a short circuit around the resistance 15.

A pair of storage batteries are indicated by the numerals 21 and 22. These storage batteries have terminals of like polarity, indicated as negative, connected to the main 13 through an ampere hour meter 23. The other terminals of the storage batteries, indicated as positive, are connected to either end of the resistance 15 through the transposing switch 24. Said transposing switch consists of two conducting plates 25 and 26 which, in the position shown on the drawing, are adapted to electrically connect contact 27 with contact 29 and contact 30 with contact 28 respectively. When the transposing switch has turned through an angle of 90 degrees, the contacting plates 25 and 26 will connect contact 27 with contact 30 and contact 29 with contact 28 respectively, thereby reversing the connections of the positive terminals of the batteries with the resistance 15. A means which may be employed for automatically moving the transposing switch through an angle of 90 degrees, is indicated diagrammatically on the drawing. A shunt coil 31 is connected across the generator terminals and will be energized to actuate the ratchet mechanism 32 each time the generator voltage builds up from a low value to a sufficiently high value. Consequently, the ratchet mechanism 32 will actuate the transposing switch every time the train starts from rest or from a low speed. This action will accordingly reverse the connections of the storage batteries relative to the resistance 15.

The ampere hour meter 23 may be of any preferred construction, but should be of the type which automatically changes its standard of registration on the reversal of current flowing therethrough. Such an ampere hour meter may be calibrated to compensate for the fact that the efficiency of a storage battery is less than 100 per cent, so that it will at all times indicate the state of charge therein. Said ampere hour meter is provided with a stationary contact 33 and a movable contact 34. Said contacts 33 and 34 when in contact, will close the circuit of shunt coils 35 across the generator terminals. Said coils 35 control an armature 36 which is normally biased to its lowermost position, making contact with contact 37 and connecting the generator field winding directly across the generator terminals. In its unbiased position, the armature 36 is adapted to contact with the contact 38, thus closing a circuit for the shunt field winding 11 across the mains 12 and 13 through the resistance 39.

A lamp circuit 40 is shown on the drawing as adapted to be connected across the mains 12 and 13 by means of a switch 41. When said switch 41 is in a position to close the circuit to the lamps, it will contact with contact 42. When said lamps are to be thrown out of circuit, the switch member 41 will be thrown in contact with contact 43. It will be noted that when the switch member 41 is in contact with contact 43, the resistance 15 will be short-circuited.

A mode of operation of the system disclosed in Figure 1 is substantially as follows. Starting with the generator at rest, the field winding 11 will be connected directly across the generator terminals. The automatic switch will be open and contact 18 will accordingly lie across contact 19 and 20, short-circuiting the resistance 15. Batteries 21 and 22 will now be connected in parallel across the mains and will supply the lamp circuit, each supplying its quota according to its capacity. Furthermore, the more highly charged battery will discharge through the other. This discharge from one battery to the other will not be registered on the ampere hour meter 23. When the car is put in motion and the generator is rotated at a sufficient speed, the voltage developed will cause the shunt coil 31 to actuate the ratchet mechanism 32, transposing the storage batteries. When a sufficient voltage has been reached to enable the generator to charge the storage batteries, the automatic switch 14 will close in the well known manner. Presuming that the action of the ratchet mechanism just described has moved the transposing switch 24 into the position illustrated in Figure 1, the full voltage of the generator will be impressed across the storage battery 21. The short circuit through the auxiliary contact 18, around the resistance 15, will be open. Assuming the switch 41 to be in contact with contact 42, the resistance 15 will be interposed between the generator and the storage battery 22 and the lamps 40. The storage battery 22 will accordingly act as a regulating medium to prevent a rise in voltage on the lamp circuit. If the switch member 41 is thrown in contact with the contact member 43, thus opening the lamp circuit, a short circuit will be completed around the resistance 15 and the storage batteries will be connected in parallel across the generator. The generator will accordingly charge both storage batteries. Any charge received by either or both of the storage batteries from the generator will be registered on the ampere hour meter 23. When said ampere hour meter registers full charge of the storage batteries, the movable contact 34 will engage the fixed contact 33 to connect the shunt coils 35 across the generator terminals. Armature 36 will be moved from its biased position into contact with contact 38. The shunt field winding 11 will now be connected through resistance 39 across mains 12 and 13 and will receive its energizing current from the storage battery circuit. The resistance 39 will be so designed that the energization of the field winding 11 will be so reduced that the generator will not develop sufficient voltage to hold closed the automatic switch 14. The energization of the coils 35 will be sufficient to hold the armature 36 in its unbiased position, thereby preventing any chattering of the automatic switch 14. When the train slows down, the voltage impressed on coils 35 will, of course, be decreased. When the voltage impressed on coils 35 is sufficiently reduced, the armature 36 will be released, re-establishing the original field circuit.

Referring now to Figure 2, a modified system is disclosed in which a variable resistance regulating device is used in the regulation of the generator. The system disclosed in Figure 2 is in many respects identical with that disclosed in Figure 1. The distinguishing features will be described. The shunt field winding 11 is connected across the terminals of the generator 10 through an adjustable rheostat 44 indicated on the drawing as a compressible pile. The resistance of said pile may be varied by the action of a bell crank lever 45 which in turn is controlled by the coil 46 in series between the battery and ampere hour meter and the voltage coil 47. The voltage coil 47 is connected across the generator terminals through the adjustable resistance 48, part of which resistance 48 is adapted to be short circuited when the movable contact 34 engages the fixed contact 33 of the ampere hour meter. The transposing switch 24 will operate in exactly the same manner as described above in connection with Figure 1. No operating mechanism for the switch 24 is illustrated in Figure 2.

A mode of operation of the system disclosed in Figure 2 will be clear from the description above in connection with Fig. 1. The relative effects of the battery coil 46 and voltage coil 47 may be designed to produce the character of regulation desired. Preferably the voltage coil 47 will be the dominating factor in the regulation of the generator, modified by the action of the modifying coil 46. When the ampere hour meter registers full net charge of the storage batteries, contact 34 will engage contact 33 to short circuit a portion of the resistance 48, thus so increasing the effect of the voltage coil 47 that it will at once reduce the generator voltage to any desired amount, preferably to the floating voltage of the battery, whereby further charging of the battery is avoided.

Two embodiments of the present invention have been described in detail. Various modifications will occur to those skilled in the art. It is desired to cover in this case all such modifications that come within the scope of the invention as defined by the appended claims.

Having described my invention, what I claim as new and desire to secure by Letters Patent of the United States, is:—

1. In a system of electrical distribution, a generator, a pair of storage batteries and a lamp circuit, said batteries having a common lead through which flows the total net current from the generator to the batteries and from the batteries to the lamp circuit, one of which batteries is adapted to regulate the lamp circuit while the other battery is being charged, integrating means connected in said common lead, and means controlled by said integrating means for reducing the field excitation of said generator.

2. In combination, a generator, a pair of storage batteries and a lamp circuit, said batteries having a common lead through which flows the total net current from the generator to the batteries and from the batteries to the lamp circuit, one of which batteries is adapted to regulate the lamp circuit while the other battery is being charged, an ampere hour meter connected to measure the ampere hours in said common lead, and means responsive to said amper hour meter for reducing the field excitation of said generator.

3. A system of electrical distribution including a shunt wound generator, mains supplied thereby, and a load circuit and storage batteries connected in parallel branches across said mains, an automatic switch between the generator on the one hand and the batteries and load circuit on the other, said batteries having a common lead, integrating means in said common lead responsive to the net state of charge of said batteries, and means under control of said first means for breaking the shunt field circuit of the generator and reestablishing the same through a resistance on the battery side of the automatic switch when a predetermined state of charge of the battery is reached.

4. A system of electrical distribution including a shunt wound generator, mains supplied thereby, and a load circuit and a pair of storage batteries connected in parallel branches across said mains, one of said batteries being connected to regulate said load circuit while the other is on charge, an automatic switch between the generator on the one hand and said batteries and load circuit on the other, said batteries having a common lead, an ampere hour meter in said lead to measure the net ampere hour input to said batteries, a relay normally completing the shunt field circuit of the generator directly across the generator terminals on the generator side of the automatic switch, and connections for said relay whereby said relay will break said normal shunt field circuit and reestablish said circuit through a resistance across the system on the battery side of the automatic switch when a predetermined charge has been delivered to said batteries, said relay being responsive to said meter.

5. A system of electrical distribution including a shunt wound generator, mains supplied thereby, and a load circuit and a pair of storage batteries connected in parallel branches across said mains, one of said batteries being connected to regulate said load circuit while the other is on charge, an automatic switch between the generator on the one hand and said batteries and load circuit on the other, said batteries having a common lead, an ampere hour meter in said lead to measure the net ampere hour input to said batteries, a relay normally completing the shunt field circuit of the generator directly across the generator terminals on the generator side of the automatic switch and connections for said relay whereby said relay will break said normal shunt field circuit and reestablish said circuit through a resistance across the system on the battery side of the automatic switch when a predetermined charge has been delivered to the battery, the resistance of said reestablished field connections causing a reduction in voltage of said generator sufficient to cause said automatic switch to open, said relay being responsive to said meter.

6. In a system of electrical distribution, a generator, a pair of storage batteries and a lamp circuit, said batteries having a common lead through which flows the total net current supplied to said batteries or discharged thereby, one of which batteries is adapted to regulate the lamp circuit while the other battery is being charged, integrating means connected in said common lead, and means controlled by said integrating means for varying the electrical characteristics of said generator whereby the output of the generator is governed by the net state of charge of said batteries.

7. In a system of electrical distribution, a generator, a pair of storage batteries and a lamp circuit, said batteries having a common lead through which flows the total net current supplied to said batteries or discharged thereby, one of which batteries is adapted to regulate the lamp circuit while the other battery is being charged, integrating means connected in said common lead, and means controlled by said integrating means for varying the electrical characteristics of said generator whereby the output of said generator is reduced when the total net charge in said batteries reaches a predetermined amount.

In witness whereof I have hereunto subscribed my name.

WILLIAM L. BLISS.